Figure 1:
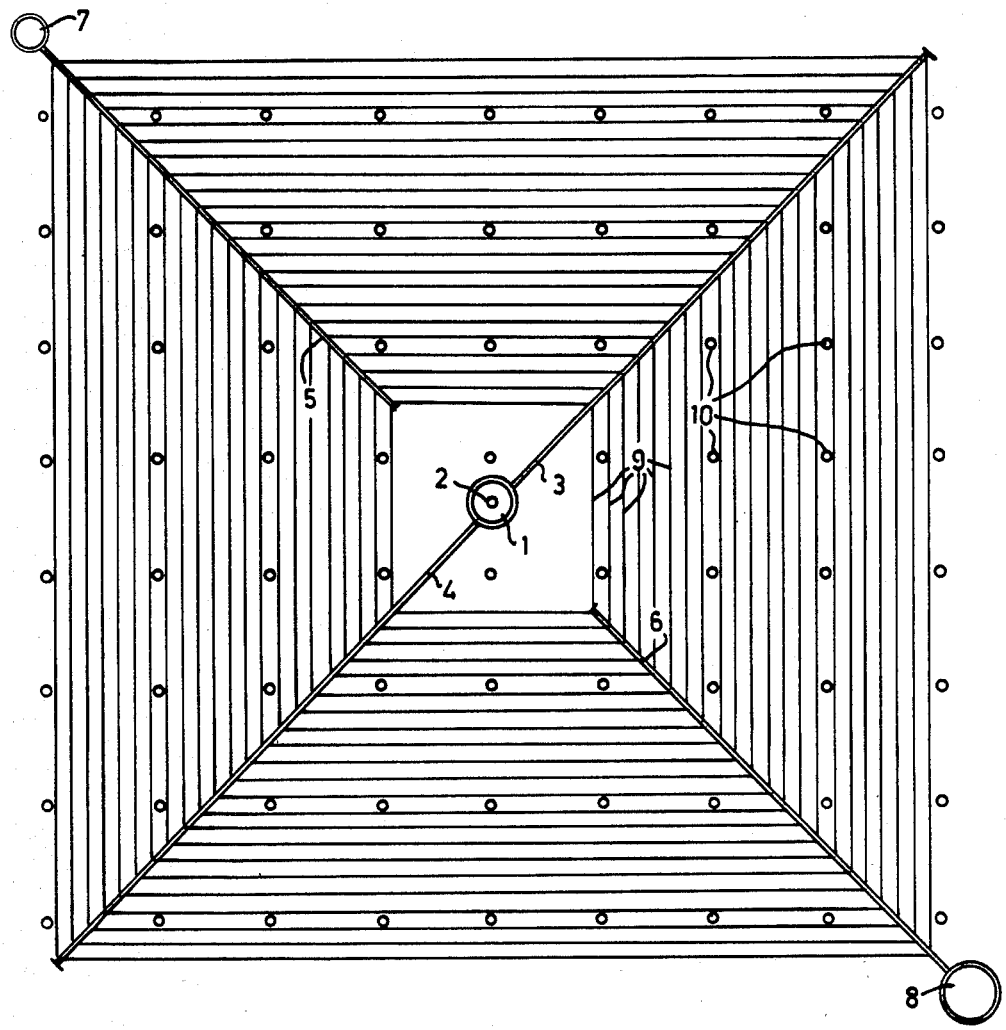

United States Patent [19]

Kristinsson

[11] Patent Number: 4,510,992
[45] Date of Patent: Apr. 16, 1985

[54] SOLAR ENERGY SYSTEM

[76] Inventor: Jón Kristinsson, 10 Noordenbergsingel, Deventer, Netherlands

[21] Appl. No.: 533,978

[22] Filed: Sep. 20, 1983

Related U.S. Application Data

[63] Continuation of Ser. No. 187,225, Sep. 15, 1980, abandoned, which is a continuation of Ser. No. 890,338, Mar. 27, 1978, abandoned.

[30] Foreign Application Priority Data

Apr. 5, 1977 [NL] Netherlands .......................... 7703701

[51] Int. Cl.³ .................................................. F24J 3/02
[52] U.S. Cl. ....................................... 165/45; 126/400; 126/436; 165/DIG. 4
[58] Field of Search ....................... 165/45, 18, 104.19, 165/DIG. 4; 126/400, 436, 437

[56] References Cited

U.S. PATENT DOCUMENTS

| | | | |
|---|---|---|---|
| 2,461,449 | 2/1949 | Smith et al. | 165/45 X |
| 2,793,509 | 5/1957 | Keen | 165/45 |
| 4,020,895 | 5/1977 | Schafer | 165/18 X |
| 4,054,124 | 10/1977 | Knoos | 126/437 X |
| 4,139,321 | 2/1979 | Werner | 165/45 |
| 4,257,397 | 3/1981 | Gouyou-Beauchamps | 126/437 X |
| 4,448,237 | 5/1984 | Riley | 165/45 X |

FOREIGN PATENT DOCUMENTS

| | | | |
|---|---|---|---|
| 2445281 | 8/1976 | Fed. Rep. of Germany | 165/45 |
| 74392 | 4/1976 | Luxembourg | 165/45 |

Primary Examiner—Sheldon J. Richter
Attorney, Agent, or Firm—Ladas & Parry

[57] ABSTRACT

A heat storage system intended for long term storage between seasons of surplus heat collected in a solar energy system for example, comprises one or several networks of ducts laid out in an earth pack, e.g. underneath a building to be heated and in between foundation members thereof. The system economizes as to expenditure of space and material, in particular with respect to storage of heat at a relatively low temperature level as is encountered in solar energy systems.

7 Claims, 4 Drawing Figures

SOLAR ENERGY SYSTEM

This is a continuation application of U.S. patent application Ser. No. 187,225 filed on Sept. 15, 1980 which is currently abandoned, the U.S. patent application Ser. No. 187,225 in turn is a continuation application of U.S. patent application Ser. No. 890,338 filed on Mar. 27, 1978 which is currently abandoned.

The invention relates to a system for temporarily storing heat, and in particular to a system storing heat collected by a solar energy collector and carried on a heat conveying medium to a storage means.

Various embodiments of a similar storage system are known in the art, such as a tank filled with water and a solid body molded of concrete or a body of solid particulate matter, gravel or a similar material for example. In order to adapt a storage system of the kind to the requirements of a heating system utilized in a building in which a surplus of heat collected in one season is conveyed into storage wherefrom in another season heat is gradually withdrawn, the storage means must have relatively huge dimensions to accommodate at a relatively low temperature the quantity of heat involved. The expenditure of space and material incurred is costly and in some cases prohibitively so.

The present invention is based on a solution of the above stated problem, viz. to reduce the expenditure involved.

Accordingly the primary object of the invention is to provide a system for storing heat at a relatively low temperature utilizing a reduced amount of material to make up a storage means.

Another object of the invention is a heating system comprising a solar energy heat collector and a heat storing means storing heat at a relatively low temperature and at low material cost.

The undesired expenditure of space and material when making up a system for temporarily storing heat is avoided according to the invention in that the heat conveying medium is led underground through a network of plastic ducts extending underneath an insulatingly sealing cover layer.

The manner in which the foregoing and other objects and features are achieved by this invention will become more apparent from the following detailed descriptions and the claims when read in conjunction with the drawings.

Figure 2:
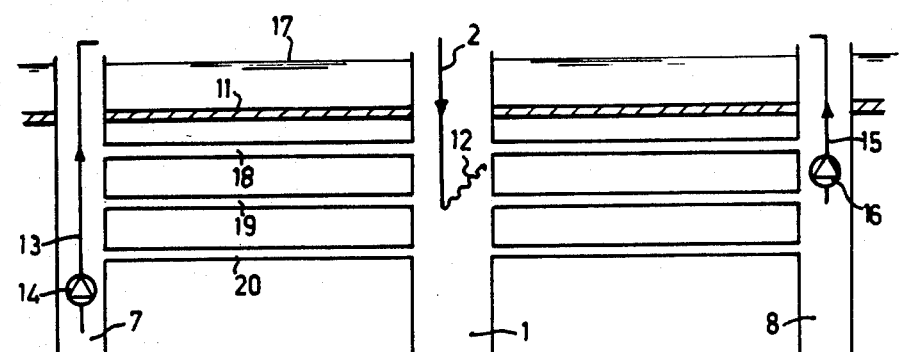
Figure 3:
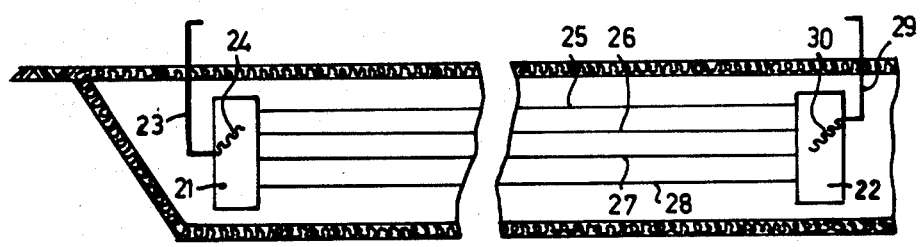

In the accompanying drawings shows:

FIG. 1 a network of plastic ducts to be laid undergound and according to an embodiment of the present invention;

FIG. 2 schematically an assembly of networks similar to that shown in FIG. 1;

FIG. 3 a further embodiment of an underground network of plastic ducts; and

Figure 4:
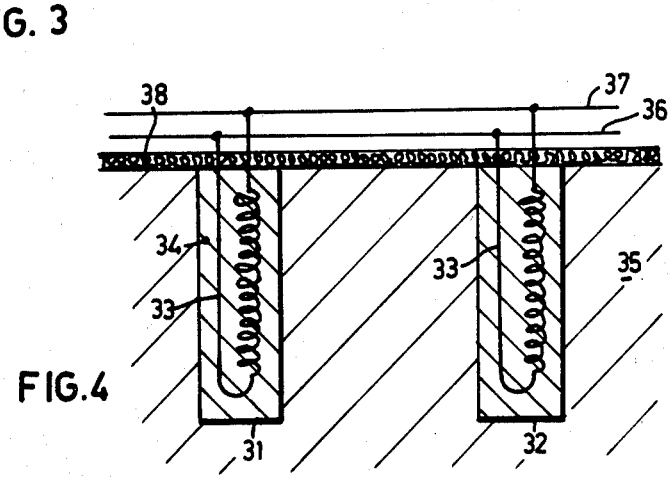

FIG. 4 a third embodiment of an underground network of plastic ducts.

When storing heat underground in particular use is made of the relatively low heat conductivity of the ground. Even below the underground water level heat conductivity is low as long as the ground water does not move due to changes of thrust of the earth. Therewith it is important that the storage area is located beneath the building in which the stored heat will be used, especially in view of the length of the ducts needed. The foundation of the building should be compatible with the means used for the storage. In particular with a foundation on piles it is advantageous to store the heat in the earth itself because the foundation on piles does not interrupt the horizontal structure underground and because in this case there is a natural lower limit for the earth pack that will get the reservoir function, viz. the earth layer in which the pile heads got stuck. In this connection it is even so that the means for putting heat in and out this earth pack respectively have to be located so far from the pile heads that the pile heads are not subject to any heating.

In a first embodiment a network of plastic ducts is laid out underground. The ducts are connected in parallel to a first manifold means and to a second manifold means, which manifold means both are arranged wholly beneath the insulating and sealing cover layer, and comprise each a pair of substantially straight pipes intersecting at their centres, the plastic ducts being positioned in a horizontal plane each at an other distance from the intersection, the first manifold means at the intersection point being connected to a first riser and the second manifold means at both ends being connected to a second and a third riser respectively. In FIG. 1 such a network is shown on the basis of a square. The first riser 2 is inserted into a bore-hole 1. According to a diagonal of the square two straight pipes 3 and 4 are connected to the bore-hole 1. Two straight pipes 5 and 6 extend along the other diagonal and end in the bore-holes 7 and 8 respectively. Plastic ducts 9 each circumscribing a square are connected at mutually equal distances between the pipe 3 and the pipes 5 and 6 respectively, and between the pipe 4 and the pipes 5 and 6 respectively. Foundation piles 10 are thrust into the earth in between the pipes and the ducts.

Preferably, as schematically shown in FIG. 2 (not to scale), several networks of the kind are laid underground one beneath the other and underneath a heat insulatingly sealing cover layer 11. Into the bore-hole 7 a riser 13 including a pump 14 is sunk almost as deep as the bottom. Into the bore-hole 8 a riser 15 including a pump 16 is sunk to a much lesser depth. The bore-holes extend to 5 meters below the land level 17. The heat insulating cover layer 11 is at 1 meter below the land level, a first network 18 of plastic ducts at 1.5 meters below the land level, a second network at 2.5 meters and a third network at 3.5 meters below the land level. The riser 2 in the centre bore-hole 1 is provided with a movable nozzle 12 whereof the depth is variable. The plastic ducts are at a mutual distance of 1 meter, their diameter is about 8 cm and they are made from polyethylene tubing. Within a surface area of the network to the amount of 3200 $m^2$ the length of tubing amounts to 13,500 meters. When per network an earth pack of 5000 $m^3$ is addressed for storing heat and if therein a temperature level of 60° C. is reached, this earth pack can store an energy of 810 GJ.

In the proposed system a stratification of the earth temperature is effected having the highest temperature near the upper side of the reservoir volume and the lowest temperature near the lower side thereof. So the networks can be laid out in earth layers differing in temperature level and by means of the movable nozzle 12 of the riser 2 when feeding hot water the temperature thereof can be taken into account so that the stratification of temperature also being built up in the bore-holes, will not be disturbed. The heat contents of an earth pack at an average temperature level of 50° C. will be 673 GJ, and the heat contents of an earth pack at an average temperature level of 40° C. will be 540 GJ. In a solar energy system a temperature level of 40° C. of water heated therein must be considered to be a minimum value.

About the functioning of a network as specified above it can further be said that the resistance to flow encountered by the heat conveying medium from the centre bore-hole 1 towards the bore-holes 7 and 8 respectively increases with the distance to be covered through the plastic ducts 9 and the manifolds 3, 4, 5 and 6. Thus the plastic ducts positioned near the centre will draw the largest flow whereby the build-up of temperature level takes place from the centre outwards.

The positioning on various heights of the feeding nozzles in the risers 14 and 16 located in the bore-holes 7 and 8 respectively enables due to the stratification, to drain off the heat conveying medium at two different temperatures. The lower temperature thereof relates to heat conveying medium for supply to the heat collector means in the system (e.g. solar energy collector means), the higher temperature relates to heat conveying medium that is moved to heat-consuming means in the system (e.g. radiators).

The piles of the foundation in the above discussed example are thrust to a depth of at least 10 meters beneath the land level 17.

In a further preferred embodiment of the heat storage system according to the invention as shown in FIG. 3 both manifold means 21, 22 are implemented in the form of a hole dug in the earth, on various heights the holes being interconnected by a number of plastic ducts 25, 26, 27, 28 horizontally distributed below the surface. Also in this system the stratification of the temperature in the earth pack through which the plastic ducts have been laid on various heights, is made use of. For this in FIG. 3 an additional supply riser 23, 24 and an additional drain riser 29, 30 have been drawn. The portions 24 and 30 respectively of the risers are resilient so that the depth of the outlet opening thereof can be varied.

In another preferred embodiment of the system according to the invention as represented in FIG. 4 both manifold means 36, 37 are arranged above the heat insulating cover layer 38, and the plastic ducts 33 are each lowered into a pit 31, 32, the pits being sunk distributed all over the surface area. Herewith it is advantageous to fill up the pits after the insertion of the plastic duct with a heat-conductive material 34. In order to increase the heat exchanging surface area the plastic ducts 37 may at least partially be shaped helically.

When arranging the plastic ducts in the earth a drain pipe pulling device can be used. With the embodiments according to FIG. 1 and FIG. 3 without any displacement of the earth pack the ducts can then be laid in the earth on the desired depth. In order to increase the heat exchanging surface area of the plastic ducts it is advantageous to provide these with contiguous contact means which after some pulling backwards of a piece of duct after its lay out will come to stand out.

What is claimed is:

1. A heat storage system for a building, comprising a plurality of networks of imperforate-walled plastic ducts for conveying a fluid heat transfer medium, said ducts being embedded in the ground beneath the building whereby the heat transfer medium passes through the ducts in thermally-conductive contact therewith and heat may thereby be delivered for storage in the ground and subsequently removed from storage for use, each network being positioned in a horizontal plane and said networks each having different temperature being disposed in the ground at different vertical levels, to utilize a stratification of the earth temperature, so that each said network positioned at a higher vertical level having a temperature substantially higher than a temperature of said network positioned at a lower vertical level, and said system also comprising a sealing layer of thermally insulating material disposed above said networks and extending thereover, and an input riser, for introducing heat transfer medium into said networks, and at least one output riser, for withdrawing heat transfer medium from said networks, each of said risers being in open communication with all of the networks and the input riser being distant from each output riser so as to avoid direct heat exchange between heat transfer medium entering and leaving said networks.

2. A heat storage system as claimed in claim 1, comprising a first manifold means and a second manifold means for each network of plastic ducts, the first and second manifold means for each network being connected to the network for delivering heat transfer medium to and from said network, and wherein each network of plastic ducts defines a plurality of passages connected in parallel between said first and second manifold means for said network.

3. A heat storage system as claimed in claim 2, wherein the first and second manifolds comprise respective pits sunk in the earth and connected by the plastic ducts, the ducts being arranged in at least two sets at different depths beneath the sealing layer and the ducts of each set being horizontally distributed beneath the sealing layer.

4. A heat storage system as claimed in claim 2, wherein the first and second manifold means are arranged above the sealing layer and the plastic ducts which interconnect the first and second manifold means are disposed in respective pits which are beneath the sealing layer and are spaced horizontally from each other.

5. A heat storage system as claimed in claim 4, wherein the pits contain thermally conductive material.

6. A heat storage system for a building, comprising a plurality of networks of imperforate-walled plastic ducts for conveying a fluid heat transfer medium, said ducts being embedded in the ground beneath the building whereby the heat transfer medium passes through the ducts in thermally-conductive contact therewith and heat may thereby be delivered for storage in the ground and subsequently removed from storage for use, each network being positioned in a horizontal plane and said networks each having different temperature being disposed in the ground at different vertical levels, to utilize a stratification of the earth temperature, and said system also comprising a sealing layer of thermally insulating material disposed above said networks and extending thereover, and an input riser, for introducing heat transfer medium into said networks, and at least one output riser, for withdrawing heat transfer medium from said networks, each of said risers being in open communication with all of the networks and the input riser being distant from each output riser so as to avoid direct heat exchange between heat transfer medium entering and leaving said networks, said heat storage system having a first manifold means and a second manifold means for each network of plastic ducts, the first and second manifold means for each network being connected to the network for delivering heat transfer medium to and from said network, and wherein each network of plastic ducts defines a plurality of passages connected in parallel between said first and second manifold means for said network, wherein:

the first and second manifold means for each network are arranged wholly beneath the sealing layer, and the first manifold means for each network comprise a first pair of substantially straight, axially aligned pipes each having two opposite ends and the second manifold means for each network comprise a second pair of substantially straight, axially aligned pipes each having two opposite ends;

said input riser is connected to each of the pipes of each first pair at the end nearer the other pipe of said first pair, a first output riser is connected to one of the pipes of each second pair at its end further from the other pipe of said second pair, and a second output riser is connected to said other pipe of said second pair at its end further from said one pipe of said second pair, said input riser being substantially equidistant from said first and second output risers and being substantially equidistant from the further ends of the pipes of each first pair; and the plastic ducts of each network are arranged in four sets, two sets of ducts being connected between said one pipe of the second pair and the two pipes of said first pair respectively and the other two sets of ducts being connected between said other pipe of the second pair and the two pipes of said first pair respectively, each duct of each set being at a different distance from the input riser from the other ducts of the set.

7. A heat storage system as claimed in claim 6, wherein the input riser and the first and second output risers are located in first, second and third bore-holes respectively, the input riser being provided with a nozzle which is of variable depth within the first bore-hole, whereby the input riser can communicate with the different networks, the first output riser opens into the second bore-hole at a high level relative to the different networks, and the second output riser opens into the third bore-hole at a low level relative to the different networks.

* * * * *